United States Patent [19]

Pfeiffer et al.

[11] Patent Number: 5,048,871

[45] Date of Patent: Sep. 17, 1991

[54] SCREWED PIPE JOINT

[75] Inventors: Gerd Pfeiffer, Mülheim; Erich Quadflieg, Krefeld; Friedrich Lenze, Ratingen; Gerhard Krug, Duisburg; Josef Siekmeyer, Ratingen, all of Fed. Rep. of Germany

[73] Assignee: Mannesmann Aktiengesellschaft, Düsseldorf, Fed. Rep. of Germany

[21] Appl. No.: 386,299

[22] Filed: Jul. 27, 1989

[30] Foreign Application Priority Data

Jul. 28, 1988 [DE] Fed. Rep. of Germany ....... 3825993

[51] Int. Cl.⁵ ............................................ F16L 35/00
[52] U.S. Cl. ..................................... 285/39; 285/175; 285/330; 285/333; 285/369; 285/913; 403/118
[58] Field of Search ............... 285/175, 330, 913, 369, 285/417, 333; 403/118, 307, 343

[56] References Cited

U.S. PATENT DOCUMENTS

| | | | |
|---|---|---|---|
| 1,474,905 | 11/1923 | Keszthelyi | 285/333 X |
| 1,781,091 | 11/1930 | Wilson | 285/333 X |
| 2,380,690 | 7/1945 | Graham | 285/333 X |
| 2,465,027 | 3/1949 | McManaway | 285/175 X |
| 4,341,481 | 7/1982 | Wollensak | 285/330 X |
| 4,341,482 | 7/1982 | Wollensak | 285/330 X |
| 4,366,971 | 1/1983 | Lula | 285/417 X |
| 4,397,484 | 8/1983 | Miller | 285/175 X |
| 4,398,754 | 8/1983 | Caroleo et al. | 285/369 X |
| 4,679,831 | 7/1987 | Kielminski | 285/333 X |
| 4,706,997 | 11/1987 | Carstensen | 285/333 X |

FOREIGN PATENT DOCUMENTS 0060549 9/1982 European Pat. Off. .
392878 3/1924 Fed. Rep. of Germany .
1502148 11/1967 France .................. 285/417

Primary Examiner—Dave W. Arola
Assistant Examiner—Carol I. Bordas
Attorney, Agent, or Firm—Cohen, Pontani & Lieberman

[57] ABSTRACT

A screwed pipe joint with a bell for connecting two pipes of a drill pipe string. The screwed pipe joint includes, in opposed relation, a first pipe having a first tapered threaded end (10) and a second pipe having a second tapered threaded end (11), the first tapered pipe end and the second tapered pipe end having a different taper and pitch, and being shaped so that when the pipes are joined they are form-locked and having an axial clearance (23, 23') therebetween; and a bell having a first and second threaded section (7, 8) complementary to and for engagement with the first and second threaded pipe ends, and an unthreaded section (9) therebetween and a radially inward projecting shoulder (24) on the unthreaded section (9) of the bell (6) opposite the first pipe (2); the first and second pipe ends having respective annular recesses (14, 13) therein defining, with the unthreaded bell section (9), an annular space (15) therebetween; a sealing sleeve within the annular space (15) having an outside diameter smaller than the inside diameter of the unthreaded section (9) of the bell (6) and being axially fixed in the recess (14) of the first pipe end.

11 Claims, 3 Drawing Sheets

SCREWED PIPE JOINT

FIELD OF THE INVENTION

The present invention relates to a screwed pipe joint with a bell for connecting two pipes of a drill pipe string and particularly to a pipe joint wherein the bell has internally threaded sections of differing direction of turn or differing pitch extending from the respective ends of the bell toward an unthreaded section at the center thereof and wherein the pipes have tapered end sections slidably engageable in interfitting manner and are provided with threaded sections complementary to the threaded sections of the bell.

BACKGROUND OF THE INVENTION

EP 00 60 549 describes a screwed pipe joint which has two differently developed internally threaded sections, the difference lying in the number of starts or in the direction of turn. Both threaded sections of the bell as well as the externally threaded section, developed complementary thereto, of the two pipes to be connected are developed cylindrically. In order to prevent relative movement between the two pipes, the unthreaded pipe ends are developed as claws which can be inserted one into the other. In this way precise positioning is possible of the pipes to be connected, for instance for a riser. The sealing function is performed by an annular sealing element which is arranged in the region of the unthreaded pipe ends and the surfaces of which, developed in frustoconical shape at its ends, is abutting in metallically sealing manner against correspondingly developed surfaces on the inner side of the claws. As a supplement, it is proposed to provide elastic seals in sealing surfaces which have corresponding recesses. This type of screwed pipe joint is not well-suited for a drill pipe joint or coupling which must transmit both longitudinal forces as a result of the weight of the drill string itself and large torques during the drilling and the joints of which are frequently broken down and then made up again.

SUMMARY OF THE INVENTION

An object of the present invention is to provide a screwed pipe joint or coupling which is particularly suitable a drill pipe coupling for deep holes and which is insensitive to fluids containing hydrogen sulfide.

This object is achieved by providing a screwed pipe joint comprising a first pipe having a first tapered threaded end and, in opposed relation thereto, a second pipe having a second tapered threaded end, said first tapered pipe end and said second tapered pipe end having a different taper and pitch, and being shaped so that when said pipes are joined said pipes are interfitting with an axial clearance therebetween; and a bell comprising first and second threaded sections complementary to and for engagement with said first and second threaded pipe ends, and an unthreaded section therebetween and a radially inward projecting shoulder on said unthreaded section of said bell opposite said first pipe; said first and second pipe ends having respective annular recesses therein defining, with said unthreaded bell section, an annular space therebetween; a sealing sleeve within said annular space having an outer diameter smaller than the inside diameter of said unthreaded section of said bell and being axially fixed in said recess of said first pipe end; said sealing sleeve comprising a first and second end surface which, when said pipes are joined, sealingly rest against said respective annular recesses of said pipe ends; and an unthreaded section on said first pipe end adjacent said recess having an axial length extending, when said pipes are joined, beyond the end of said threaded section of said bell and having an outside diameter less than the radial length of said shoulder of said bell. Advantageous further embodiments are provided hereinafter.

As compared with a standard API joint with welded couplers, the proposed solution is characterized by the fact that the total force to be taken up as a result of the longitudinal force and the torque are distributed over differently developed elements of the joint or coupling. To this end, the interfitting connection of the pipe ends is of particular importance since in this way working torques which are as high as desired can be transmitted during the drilling, independently of the threading moment. For this purpose, the cross-section of the pipe ends can be developed as splined-shaft and splined-hub or internally grooved cylindrical member, respectively. Other possible solutions are a serrated toothing or development as a claw. Furthermore, one element of the profile, for instance a spline, a tooth or a claw, can have a different circumferential lengths as compared to the others so that assurance is had that the point of attack of the thread of the pipe for the screwing to the bell and the correct gap position of the complementary developed profiles of the pipe ends correspond to each other.

The two threaded sections of the bell and of the corresponding pipes are conically developed with a different direction of turn, different pitch and cone angle. The conical development of the threaded section has the advantage, as compared with a cylindrical development, that a worn thread is more easily rethreaded and that, as a result of the deep insertion of the spigot into the bell part, the threaded joining can be effected with only a few revolutions. The brief period of time resulting from this for the screwed making up or breaking down of pipe joints is a substantial cost factor in view of the large number of required disassemblies and joinings. The different cone angle and the different pitch of the two threaded sections are so adapted to each other that in unscrewed condition the pipe which lies on top in the screw coupling is free and the pipe hanging down therefrom remains interfittingly connected to the bell. In this connection, the extent of the remaining overlap between the spigot part of the pipe and the bell should be sufficient, such that that the supporting of at least a three-pipe string is still possible. In order for the unscrewing to be unambiguously limited, the unthreaded section of the bell has a radially inwardly protruding shoulder on the end facing the drill point. Upon the unscrewing, this should will rest against the surface of the sealing sleeve which protrudes beyond the recess of the pipe end. The annular sealing sleeve itself is arranged in the annular space which is defined, on the one hand, by the unthreaded section of the bell and in each case, the opposite recess of the two pipe ends. The radial length of the two recesses is so dimensioned that the remaining wall thickness in the region of the pipe ends is sufficient for the transmission of the working torque. For the axial fixing of the sealing sleeve the latter has, in the region of one end thereof, an internally threaded section which can be screwed together with the externally threaded section developed complementary thereto arranged in the recess of the pipe end which faces upward in the pipe string. In order to facilitate the turning of the sealing sleeve, recesses, for instance grooves or holes into which a corresponding tool can engage, are arranged on the opposite end. Threadably joining together is one possibility for the axial fixing of the sealing sleeves; another possibility would be the development of a protruding nose on the pipe end, which would engage in a corresponding recess in the sealing sleeve.

In the joined condition, the end surfaces of the sealing sleeve rest in sealing fashion against the annular surface of the corresponding recess of the pipe ends, while the interfitting connection at the pipe ends exhibits axial play in this state. The resting surfaces of the sealing sleeve in the recess of the pipe ends accomplish or serve the required hydraulic sealing function and, with simultaneous limitation of the joining for the bell, absorb the necessary initial impact stress for the tensile loading.

The joining of the disclosed drill pipe coupling is effected in the following steps. In the shop, the bell is first screwed in counterclockwise rotation onto the spigot part of a pipe which subsequently points upward in the drill string, whereupon the annular sealing sleeve is screwed in. For the bell to be in the correct position for the pipe to be connected, the bell is turned back in clockwise rotation against the shoulder stop of the unthreaded section. The individual pipes are delivered in this condition and the bell-free end of the next pipe is inserted with the customary aids on the drill platform into the upward facing bell of the part of the string already installed. In this connection it is important that, due to the special development of the interfitting connection, the point of engagement of the thread corresponds to the correct gap position of the connecting parts whether they be splines, teeth or claws. In each case the dimensions are so adapted to each other that, before the bell is turned, the connecting parts of the interfitting connection are already in engagement. Thereupon the bell is turned in counterclockwise direction, as seen in the direction towards the drill point, and in that way the two pipe ends are pulled together without rotation of their own until the end surfaces of the sealing sleeve come to rest. The arrangement of the left-hand thread on the bottom side of the pipe coupling has the purpose of avoiding, in clockwise-rotating drilling operation, unintended loosening of the threaded connection due to the unavoidable contact of the bell with the wall of the bore hole.

For a similar purpose it is provided that the outside diameter of the sealing sleeve be always somewhat smaller than the inside diameter of the unthreaded section of the bell. In this way the bell is prevented from contacting the sealing sleeve during the rotation and, in this way, unscrewing it.

For the loosening of the connection, the opposite procedure is followed. The bell is turned in clockwise direction and thus the two pipes move apart. Before the unscrewing stop is reached, the upper pipe is free and can be pulled out. The downward hanging pipe remains in partial interfitting connection with the bell, with an overlap which permits the supporting of a three-pipe string.

Another advantage of the proposed drill pipe coupling results from the fact that, due to the elimination of the welded coupler, it is insensitive to corrosive agents such as, for instance, hydrogen sulfide.

BRIEF DESCRIPTION OF THE DRAWING

The drill pipe coupling of the invention will be further explained in the drawings, in which.

DETAILED DESCRIPTION OF THE PRESENTLY PREFERRED EMBODIMENT

Figure 1:
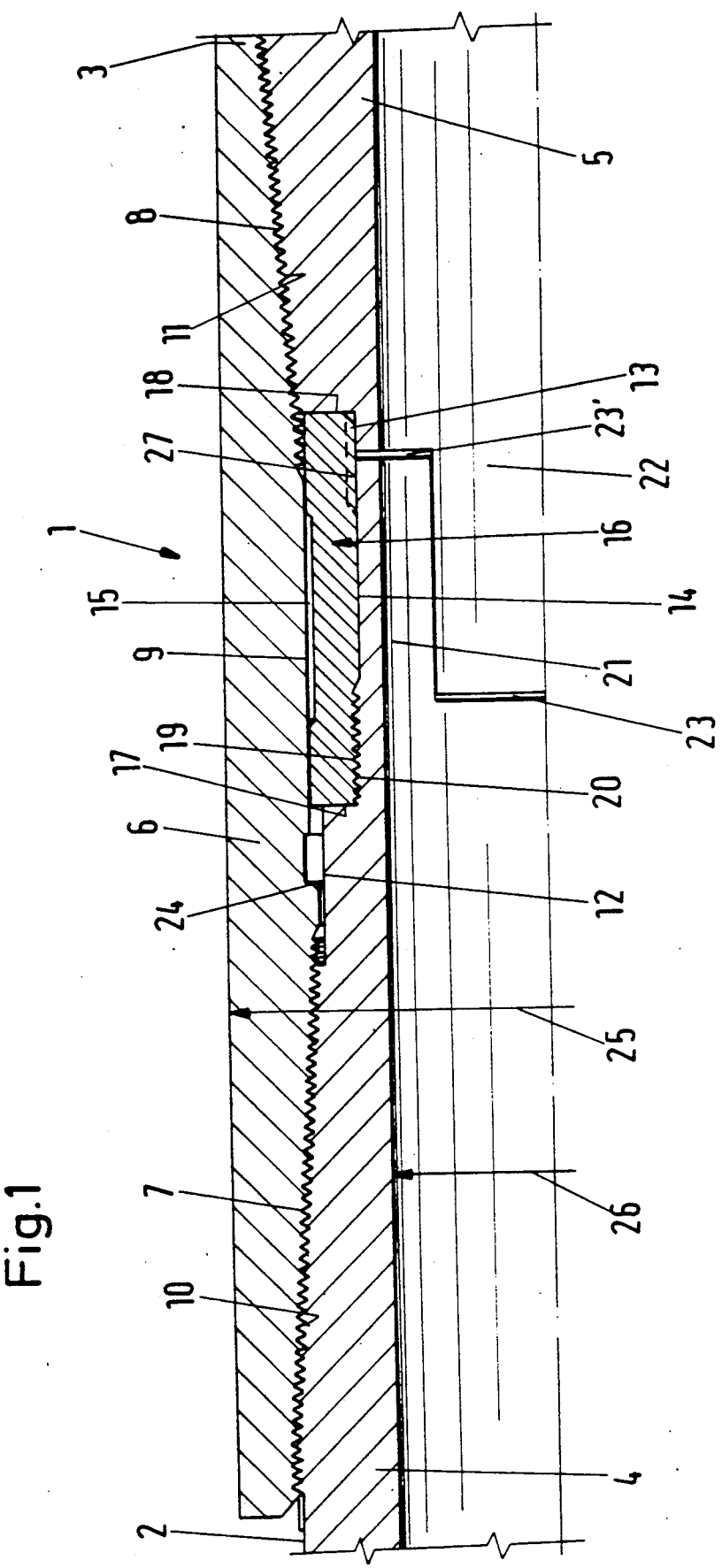
FIG. 1 is a fractional longitudinal cross-sectional view through the drill pipe coupling of the invention, shown in joined condition.
Figure 2:
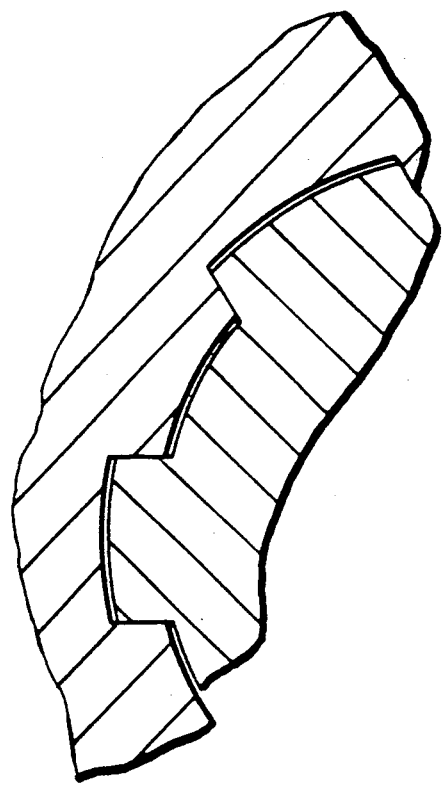
FIG. 2 is a fractional, enlarged view of the crosssectional view of another embodiment of an interfitting connection of two unthreaded pipe ends, particularly developed as splined-shaft and corresponding splined-hub.
Figure 3:
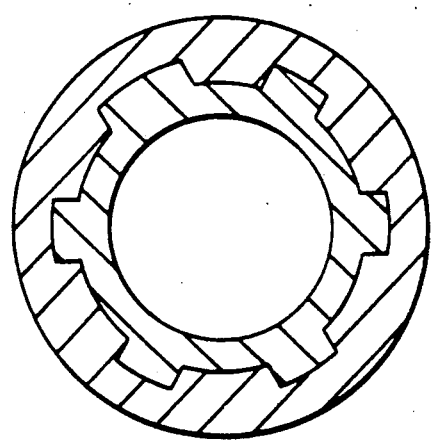
FIG. 3 is a cross-sectional view of the fractional view of FIG. 2.
Figure 4:
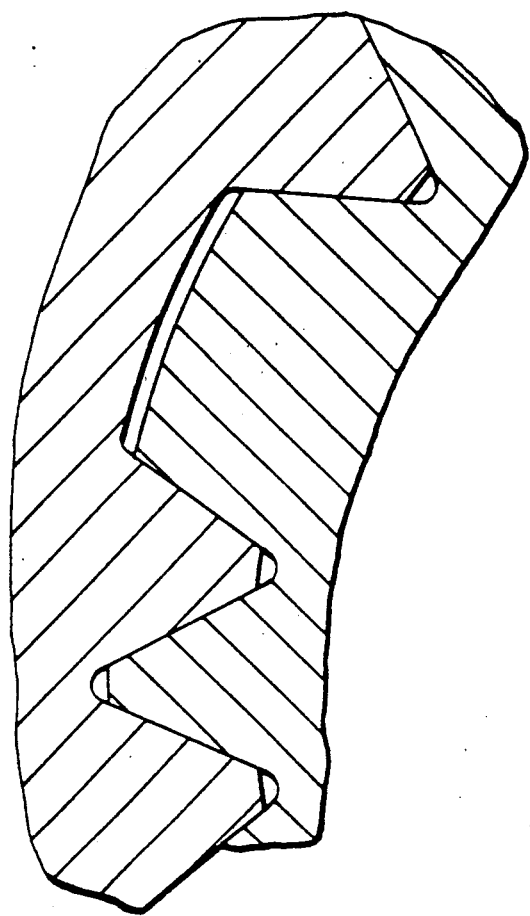
FIG. 4 is a fractional, enlarged view of the crosssectional view of yet another embodiment of the interfitting connection of two unthreaded pipe ends, particularly developed as serrated toothing.
Figure 5:
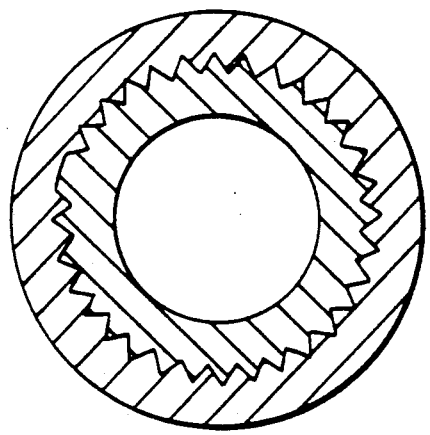
FIG. 5 represents a cross-sectional view of the fractional view of FIG. 4.

In FIG. 1 a fractional longitudinal cross-section through the drill pipe joint or coupling 1 of the invention is shown in joined condition. Coupling 1 comprises a pipe 2 which, by definition, is to be the pipe which hangs downward in the drill string and of a pipe 3 hanging above it, as well as of the bell 6 connecting the two pipes 2, 3. Both pipes 2, 3 have an upset pipe-end region 4, 5, the transition of which into the thinner pipe wall has been omitted here. The bell 6 has two conically developed threaded sections 7, 8 and an intermediate unthreaded section 9. The threaded sections 7, 8 can be screwed together with the threaded sections 10, 11, of the pipes 2, 3 having complementary shape. The tapers of the two threaded sections 7, 8 and 10, 11, respectively, are different and in this embodiment amount to about 1:8 for the threaded section 7 hanging downward in the string and about 1:6 for the upper section 8, 11. The first-mentioned threaded section 7, 10 has a left-hand thread and the second 8, 11 has a right-hand thread. Furthermore, this upper threaded section 8, 11 has a double thread. The threaded sections 10, 11 of the two pipes 2, 3 do not extend to the end but terminate in the region of the pipe ends which are connected in interfitting manner to each other. These sections 12, 13 have a recess 13, 14, the section 13 and the recess 13 being congruent in the case of the upper pipe 3. The recesses 13, 14 and the unthreaded section 9 of the bell 6 define an annular space 15 within which a sealing sleeve 16 is arranged. In the joined condition, as shown here, the end surfaces 17, 18 of the sealing sleeve 16 limit the screwing and at the same time hydraulically seal the coupling 1. In order to fix the sealing sleeve 16 in the recess 14 of the pipe 3, the sleeve 16 has an internally threaded section 19 which can be screwed to the externally threaded section 20 of the recess 14, which is developed complimentary thereto. The working torque during the drilling is transmitted by the interfitting connection of the two pipe ends. In this embodiment, the pipe ends are developed as claws 21, 22 which can be inserted one within the other. In the joined state, the pipes have an axial play 23, 23. Upon disassembly, the bell 6 is positioned by the radially inward projecting shoulder 24 which is developed on the end of the unthreaded section 9. This shoulder 24 is then abutting against the upper part of the end surface 17 of the sealing sleeve 16. The outside dimension of the bell 6, represented here by the arrow 25, corresponds to that of a standard API coupler. Similarly, the bore is flush in the region of the coupler 1 with an inside diameter, represented here by the arrow 26, which corresponds to that of an API coupler.

The joining of the two pipes 2, 3 takes place in the following steps. In the workshop, prior to delivery, the bell 6 is screwed with counterclockwise rotation onto the threaded section 10 which will subsequently point upward in the drill string. The sealing sleeve 16 is then screwed into the recess 14 of the pipe 2 until the end surface 17 comes to rest. In order that a suitably developed turning tool can be used for the screwing-in of the sealing sleeve 16, the sealing sleeve 16 is provided with a corresponding recess 27 (shown only diagrammatically here) on the opposite ends. On the drill platform, the bell-free end of the next pipe 3 is inserted into the upward pointing bell 6 in such a manner that the threaded engagement point corresponds to the corresponding gap of the claw connection. By turning the bell 6, the two pipes 2, 3 are pushed one into the other in the region of the claws 21, 22 until the end surface 18 of the sealing sleeve 16 comes to rest. By a corresponding torque tightening the coupling 1 is sealed off in the region of the two end surfaces 17, 18.

The unscrewing is effected in the manner that the bell 6 is turned in the other direction and the two pipes 2, 3 move apart in the region of the claws 21, 22. Before the shoulder 24 which limits the unscrewing comes to rest against the end surface 17 of the sealing sleeve 16, the upper pipe 3 is free while the lower pipe 2 is still connected in interfitting manner with the bell 6. The extent of overlap should be sufficient for supporting a three-rod string.

Since these as well as further embodiments and modifications thereto are intended to be within the scope of the present invention, the above description should be construed as illustrative and not in a limiting sense, the scope of the invention being defined solely by the following claims.

What is claimed is:

1. A screwed pipe joint for connecting first and second pipes of a drill pipe string, said pipe joint comprising:
   in opposed relation the first pipe (2) having a first tapered threaded end (10) and the second pipe (3) having a second tapered threaded end (11), said first tapered pipe end and said second tapered pipe end having a different taper and pitch and being shaped so that, when said pipes are joined, said pipes engage interfittingly having an axial clearance (23, 23') therebetween; and
   a bell (6) comprising first (7) and second (8) internal threaded sections complementary to and for engagement with said first (10) and second (11) threaded pipe ends; an unthreaded section (9) between said first and second internal threaded sections; and a radially inward projecting shoulder (24) on said unthreaded section (9) of said bell (6) opposite said first pipe (2); said first and second pipe ends having a respective annular recesses (14, 13) therein defining, with said unthreaded bell section (9), an annular space (15) therebetween;
   a sealing sleeve within said annular space (15) having an outside diameter smaller than the inside diameter of said unthreaded section (9) of said bell (6) and being axially fixed in said recess (14) of said first pipe end; and
   an unthreaded section (12) on said first pipe end adjacent said recess (14) said section (12) extending in axial direction, when said pipes are joined, beyond the end of said unthreaded section (9) of said bell (6) and said section (12) having an outside diameter less than the radial projection distance of said shoulder (24) of said bell (6).

2. The screwed pipe joint according to claim 1, wherein said first threaded end (7) of said bell (6) and said first threaded end (10) of said first pipe (2) has a left-hand thread and a flatter taper than said second pipe end (11) and second threaded bell section (8); and said second threaded pipe end (11) and said second threaded bell section (8) have a right-hand thread and a greater pitch than said first threaded pipe end (10) and said first threaded bell section (7).

3. The screwed pipe joint according to claim 1, wherein said taper and said pitch of said respective threaded pipe ends and bell sections (10, 7), (11, 8) are dimensioned so that, in unscrewed condition, said second pipe (3) is free and said first pipe (2) hanging below and remaining connected in interfitting manner with said bell (6).

4. The screwed pipe joint according to claim 3, wherein the extent of said interfitting connection in the unscrewed condition is sufficient to support a three-pipe string.

5. The screwed pipe joint according to claim 1, additionally comprising a threaded section (19) located internally on said sealing sleeve (16); and complementary thereto an externally threaded section (20) on said recess (14) in said first pipe end (10).

6. The screwed pipe joint according to claim 1, wherein the radial length of said two recesses (14, 13) is dimensioned so that the remaining wall thickness in the region of said pipe ends is sufficient for transmitting the working torque.

7. The screwed pipe joint according to claim 1, wherein said pipes (2, 3) are interfitted by one pipe being provided with a splined-shaft cross-sectional profile and the other adjacent pipe having a corresponding splined-hub cross-sectional profile.

8. The screwed-pipe joint according to claim 7, wherein said profile comprises distributed symmetrically over the circumference thereof at least two splines or a multiple thereof; said spline and one corresponding hub differing in the circumferential length thereof.

9. The screwed pipe joint according to claim 1, wherein interfitting connection of said pipe ends comprises a serrated toothing, one tooth and corresponding tooth gap having a different profile.

10. The screwed pipe joint of claim 1, wherein said pipe ends comprise claws (21, 22); said claw and corresponding claw gap having different circumferential length.

11. The screwed pipe joint according to claim 1, wherein said sealing sleeve (16) has a recess (27) on the end of said sleeve opposite said threaded section (19) for receiving a tool therein.

* * * * *